(12) United States Patent
Ledet (10) Patent No.: US 8,959,163 B1
(45) Date of Patent: Feb. 17, 2015

(54) METHOD AND APPARATUS OF ORGANIZING AND DELIVERING DATA TO INTENDED RECIPIENTS

(75) Inventor: David Gerard Ledet, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 571 days.

(21) Appl. No.: 13/198,520

(22) Filed: Aug. 4, 2011

Related U.S. Application Data (60) Provisional application No. 61/370,574, filed on Aug. 4, 2010, provisional application No. 61/370,584, filed on Aug. 4, 2010.

(51) Int. Cl.
*G06F 15/16* (2006.01)

(52) U.S. Cl.
USPC ........... 709/206; 709/203; 709/204; 709/205; 709/207; 709/217; 709/224; 705/319

(58) Field of Classification Search
USPC ......................................... 709/203–207, 224
See application file for complete search history.

(56) References Cited

U.S. PATENT DOCUMENTS

| | | | |
|---|---|---|---|
| 2004/0082352 A1* | 4/2004 | Keating et al. | 455/519 |
| 2008/0147795 A1* | 6/2008 | Heidloff et al. | 709/204 |
| 2009/0144377 A1* | 6/2009 | Kim et al. | 709/206 |
| 2009/0221302 A1* | 9/2009 | Luiro et al. | 455/456.6 |
| 2010/0030715 A1* | 2/2010 | Eustice et al. | 706/12 |
| 2010/0082728 A1* | 4/2010 | Cooper | 709/202 |
| 2010/0104081 A1* | 4/2010 | Berman et al. | 379/201.02 |
| 2010/0198917 A1* | 8/2010 | Petersen et al. | 709/204 |
| 2012/0066614 A1* | 3/2012 | Amidon et al. | 715/751 |
| 2012/0198917 A1* | 8/2012 | McLean et al. | 73/30.02 |

* cited by examiner

*Primary Examiner* — Ario Etienne
*Assistant Examiner* — Kidest Mendaye
(74) *Attorney, Agent, or Firm* — Haynes and Boone, LLP (57) ABSTRACT

Disclosed are an apparatus and method of organizing a plurality of data recipients subscribed to receive information from a leader. An example method may include receiving a plurality of response messages from at least a portion of the plurality of data recipients, and determining a decrease in the plurality of response messages received from the at least a portion of the plurality of data recipients based on a previous number of response messages received. The method may also include removing at least one data recipient from the plurality of data recipients and adding the removed at least one data recipient to a new group of data recipients responsive to the decrease in the plurality of response messages received.

14 Claims, 9 Drawing Sheets

| Message | Followers Interest Count (fic) |
|---|---|
| Msg[1] | 98 |
| Msg[2] | 82 |
| Msg[3] | 122 |
| ... | ... |

| Message | Followers Interest Count (fic) | # Chars Per Response (cpr) |
|---|---|---|
| Msg[1] | 98 | 25 |
| Msg[2] | 82 | 31 |
| Msg[3] | 122 | 26 |
| ... | ... | ... |

| Message | Followers Interest Count (fic) | # Chars Per Response (cpr) | Responses without Interaction (rwi) |
|---|---|---|---|
| Msg[1] | 98 | 25 | 36 |
| Msg[2] | 82 | 31 | 22 |
| Msg[3] | 122 | 26 | 16 |
| ... | ... | ... | ... |

| 1 | if (ficDecrease5 = (FIC[Msg-5] - FIC[Msg-4]) >= 0) THEN<br>    fic5Percentage = ((ficDecrease5 / FIC[MSG-5]) * 100) | Get percentage decrease between last 4th and 5th messages. |
|---|---|---|
| 2 | if (ficDecrease4 = (FIC[Msg-4] - FIC[Msg-3]) >= 0) THEN<br>    fic4Percentage = ((ficDecrease4 / FIC[MSG-4]) * 100) | Get percentage decrease between last 3rd and 4th messages. |
| 3 | if (ficDecrease3 = (FIC[Msg-3] - FIC[Msg-2]) >= 0) THEN<br>    fic3Percentage = ((ficDecrease3 / FIC[MSG-3]) * 100) | Get percentage decrease between last 2nd and 3rd messages. |
| 4 | if (ficDecrease2 = (FIC[Msg-2] - FIC[Msg-1]) >= 0) THEN<br>    fic2Percentage = ((ficDecrease2 / FIC[MSG-2]) * 100) | Get percentage decrease between last 1st and 2nd messages. |
| 5 | if (ficDecrease1 = (FIC[Msg-1] - FIC[Msg]) >= 0) THEN<br>    fic1Percentage = ((ficDecrease1 / FIC[MSG]) * 100) | Get percentage decrease between the current message and the last. |
| 6 | avgDecrease = (fic1Percentage + fic2Percentage + fic3Percentage + fic4Percentage + fic5Percentage) / 5 | avgDecrease = the average of the percentage decrease in the interest of the followers for the last 5 messages. |
| 7 | if (avgDecrease >= 15) split the followers | If the average decrease in the followers interest has dropped 15%, then it is time to split the followers. |

| | | /500 |
|---|---|---|
| 1 | if (cprDecrease5 = (CPR[Msg-5] - CPR[Msg-4]) >= 0) THEN<br>    cpr5Percentage =( (cprDecrease5 / CPR[MSG-5]) * 100) | Get percentage decrease between last 4th and 5th messages. |
| 2 | if (cprDecrease4 = (CPR[Msg-4] - CPR[Msg-3]) >= 0) THEN<br>    cpr4Percentage =( (cprDecrease4 / CPR[MSG-4]) * 100) | Get percentage decrease between last 3rd and 4th messages. |
| 3 | if (cprDecrease3 = (CPR[Msg-3] - CPR[Msg-2]) >= 0) THEN<br>    cpr3Percentage =( (cprDecrease3 / CPR[MSG-3]) * 100) | Get percentage decrease between last 2nd and 3rd messages. |
| 4 | if (cprDecrease2 = (CPR[Msg-2] - CPR[Msg-1]) >= 0) THEN<br>    cpr2Percentage =( (cprDecrease2 / CPR[MSG-2]) * 100) | Get percentage decrease between last 1st and 2nd messages. |
| 5 | if (cprDecrease1 = (CPR[Msg-1] - CPR[Msg]) >= 0) THEN<br>    cpr1Percentage =( (cprDecrease1 / CPR[MSG]) * 100) | Get percentage decrease between the current message and the last. |
| 6 | avgDecrease = (cpr1Percentage +cpr2Percentage + cpr3Percentage + cpr4Percentage + cpr5Percentage) / 5 | avgDecrease = the average of the percentage decrease in the number of characters in responses of the followers for the last 5 messages. |
| 7 | If (avgDecrease >= 15) split the followers | If the average decrease in the characters per response has dropped 15%, then it is time to split the followers. |

FIG. 5

| | | /— 600 |
|---|---|---|
| 1 | if (rwiDecrease5 = (RWI[Msg-4] - RWI[Msg-5]) >= 0) THEN<br>    rwi5Percentage =( (rwiDecrease5 / RWI[MSG-5]) * 100) | Get percentage decrease between last 4th and 5th messages. |
| 2 | if (rwiDecrease4 = (RWI[Msg-3] - RWI[Msg-4]) >= 0) THEN<br>    rwi4Percentage =( (rwiDecrease4 / RWI[MSG-4]) * 100) | Get percentage decrease between last 3rd and 4th messages. |
| 3 | if (rwiDecrease3 = (RWI[Msg-2] - RWI[Msg-3]) >= 0) THEN<br>    rwi3Percentage =( (rwiDecrease3 / RWI[MSG-3]) * 100) | Get percentage decrease between last 2nd and 3rd messages. |
| 4 | if (rwiDecrease2 = (RWI[Msg-1] - RWI[Msg-2]) >= 0) THEN<br>    rwi2Percentage =( (rwiDecrease2 / RWI[MSG-2]) * 100) | Get percentage decrease between last 1st and 2nd messages. |
| 5 | if (rwiDecrease1 = (RWI[Msg-1] - RWI[Msg]) >= 0) THEN<br>    rwi1Percentage =( (rwiDecrease1 / RWI[MSG]) * 100) | Get percentage decrease between the current message and the last. |
| 6 | avgDecrease = (rwi1Percentage + rwi2Percentage + rwi3Percentage + rwi4Percentage + rwi5Percentage) / 5 | avgDecrease = the average of the percentage decrease in the number of responses that have not had interaction for the last 5 messages. |
| 7 | If (avgDecrease >= 15) split the followers. | If the average decrease in the number of responses without user interaction has decreased 15%, then it is time to split the followers. |

METHOD AND APPARATUS OF ORGANIZING AND DELIVERING DATA TO INTENDED RECIPIENTS

CROSS REFERENCE TO RELATED APPLICATIONS

This application claims benefit to provisional application No. 61/370,574, entitled "Ordering recipients in social networking", filed on Aug. 4, 2010, and to provisional application No. 61/370,584, entitled "Managing recipients in social networking", filed on Aug. 4, 2010, the entire contents of which are hereby incorporated by reference.

TECHNICAL FIELD OF THE INVENTION

This invention relates to a method and apparatus of organizing groups of users, subscribers and/or recipients of data, and more specifically, to organizing groups of users as intended data recipients based on user preferences.

BACKGROUND OF THE INVENTION

Within the realm of social networking, the number of friends/followers/recipients is an indication of the relative level of success a user will have at sharing information. Famous individuals, corporate entities and other well established user accounts on social networking websites are constantly identified and have the potential to reach millions of friends/followers/recipients (for simplicity purposes the friends/followers/recipients will be referred to as data recipients or 'recipients'). However, when the number of recipients reaches into the thousands, the social networking paradigm begins to break down.

It may be said that small and obscure groups of people who are passionately interested in a specific subject may be more likely to focus on finite tasks and accomplish their goals. Online social networking tools should be capable of fostering these sorts of clusters. But, when the conversation grows too large the focuses are often expanded and the recipients may lose interest quickly. Not only do audiences of recipients feel estranged, the participants also start self-censoring. People who suddenly find themselves with really large audiences often start writing more cautiously and behaving like politicians or corporate drones.

In one example, if someone or one user account has obtained 1.5 million recipients on a data messaging application, clearly they are among the rare and famous online individuals. Their response and data messages may include anything as they have already reached instant fame. In another example, if you have a hundred followers, you may be considered to just be merely chatting with pals. The middle ground—when someone amasses, roughly several thousand recipients, the social aspect of social media begins to fall apart by trying to keep their interests perked.

Figure 1:
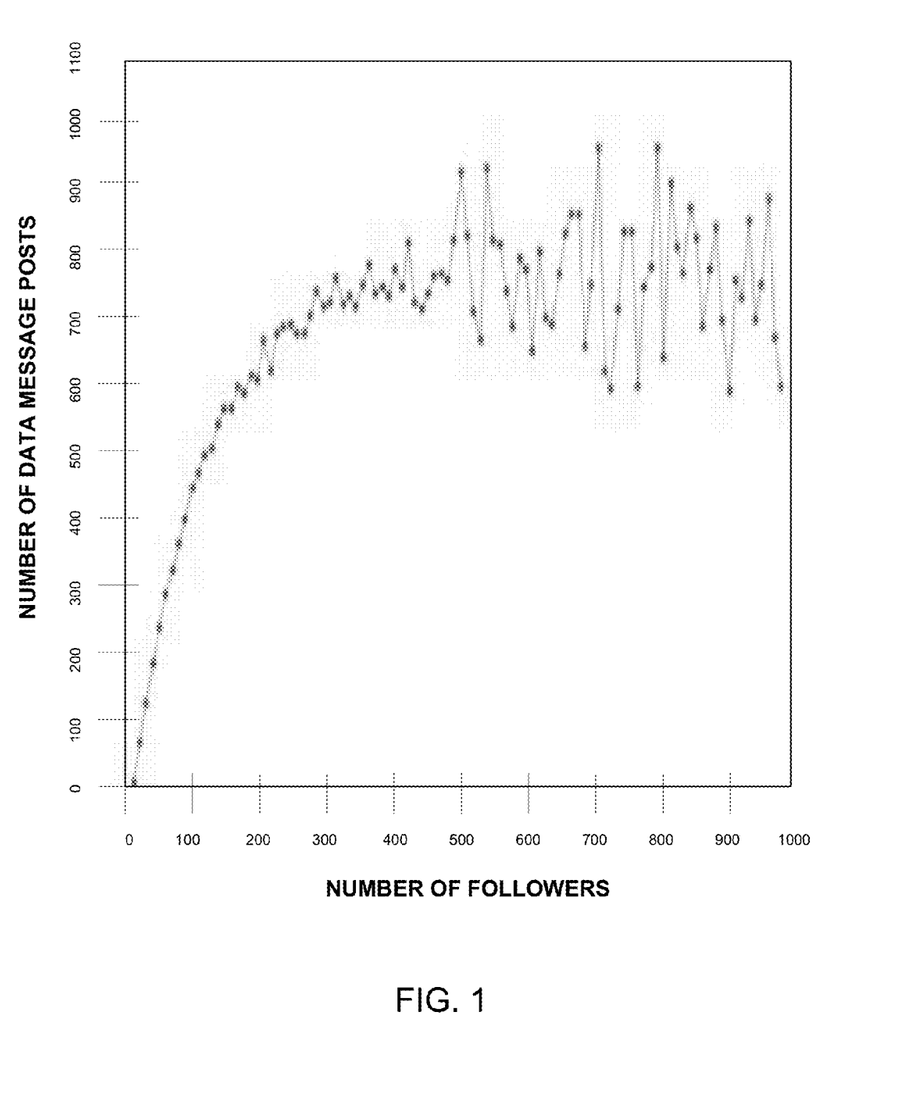
FIG. 1 illustrates an example graph of social networking message posts versus a number of data recipients, according to example embodiments of the present invention.

FIG. 1 illustrates a graph depicting a number of data posts on a social networking user account in relation to a number of followers or data recipients of that particular user account. Referring to FIG. 1, it can be noted that the number of posts leveled-out after a user obtained 400 followers. According to the graph, it can therefore be theorized that once a user has more than 400 followers. The user account or sender did not increase the number of posts, but the number of posts remained around the 800 level.

The intimacy of the social network begins to change when the number of recipients grows into the thousands. For example, unlike when there are a limited number of followers, the user or sender begins to believe the recipients are satisfied with the content of the posts being sent. As the number of recipients grows, the user is hesitant to share the same intimate subject matter, but becomes naturally more political and concerned that the recipients may not be interested in the narrow scope of certain posts. As a result, the timeliness in receiving a response from a user's posts (feedback) may begin to diminish or disappear completely.

A British anthropologist, Robin Dunbar, theorized that the maximum size of a social group in which everyone involved could maintain a mental record of all of the interpersonal relationships was 150. This is considered "Dunbar's number." These are relationships in which an individual knows each person and how each person relates to every other person. Numbers larger than 150 generally require more restrictive rules, laws, and enforced norms to maintain a stable and cohesive group.

Dunbar's number is possibly one reason why users are more careful in posting messages to a large number of followers. Managing a large number of recipients is not easy, but the success and influence is directly proportional to the activeness of the recipients. Recognizing the behavior of the recipients may also provide insight into how to maintain their satisfaction with the content of the posts. Some of the factors that will determine the influential power of the posts and messaging may include the activeness of the recipients (feedback), the forwarding activity of the messages (sharing), the currency with which the recipients respond, etc.

Managing a large and possibly increasing number of recipients may require certain modifications to the messaging application used to share information (e.g., social networking website, blog, group messaging, etc.). For example, with short messaging service (SMS) applications, the notion of groups includes followers or recipients who are tagged into different groups. The leader is then enabled to send data messages to one of the groups without the need of sending individual messages to each person, or sending a single message to all of the followers. Groups are viewed as a way to organize many people within a single group and to obtain more followers for each group. When a group is organized, all members of the group automatically follow the data messages posted for that group, and the leader may automatically follow the individuals as well. A leader may obtain more followers by joining a group. When a group is created, it is unique and no one can replicate that specific group. Therefore, the "administrator" of that group may be viewed as the expert. Anyone who joins that group will follow the leader or administrator of the group.

Groups provide a social networking option for those leaders with a relatively small number of followers. The group situation becomes increasingly difficult to manage with a leader that already has a large number of recipients or is observing a significant increase in the number of recipients. Another concern is that the leader will not be able to divide all of the users into the correct group(s). The group strategy may be best utilized for leaders that do not have a large number of recipients.

Multiple user accounts is another strategy to allow the leader to obtain a number of updates from a subset of recipients who are controlled by the leader. There are existing applications that allow leaders to maintain multiple messaging accounts and centrally manage those accounts. For example, when the leader is replying to the recipients, there is a function (e.g., a button on the "compose" message screen) that permits the leader to switch the "sender" or leader's account. The leader can setup a "follow"-only account, and when replying to something from that account, a simple sending option may permit the reply to be sent form the leader's "real" account. None of these examples provide the success desired by the social networking leaders and recipients. Many leaders are not satisfied with having multiple user accounts or managing each individual recipient among many others. The efficiency and productivity of managing a social network requires additional measures to be enacted.

SUMMARY OF THE INVENTION

One embodiment of the present invention may include a method of organizing a plurality of data recipients subscribed to receive information from a leader. The method may provide receiving a plurality of response messages from at least a portion of the plurality of data recipients, and determining a decrease in the plurality of response messages received from the at least a portion of the plurality of data recipients based on a previous number of response messages received. The method may also include removing at least one data recipient from the plurality of data recipients and adding the removed at least one data recipient to a new group of data recipients responsive to the decrease in the plurality of response messages received.

Another example embodiment of the present invention may include an apparatus configured to organize a plurality of data recipients subscribed to receive information from a leader, the apparatus may include a receiver configured to receive a plurality of response messages from at least a portion of the plurality of data recipients. The apparatus may also include a processor configured to determine a decrease in the plurality of response messages received from the at least a portion of the plurality of data recipients based on a previous number of response messages received, and remove at least one data recipient from the plurality of data recipients and adding the removed at least one data recipient to a new group of data recipients responsive to the decrease in the plurality of response messages received.

BRIEF DESCRIPTION OF THE DRAWINGS

FIGS. 4, 5 & 6 illustrate example data functions used to obtain data recipient activity and response data, according to an example embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, a management application embodied on a computer device (e.g., server, personal computer, laptop, tablet device, mobile station, smartphone, etc.) may be configured to automatically assist a user of a social networking application. The management application may be an add-on application, patch application, middleware application and/or a separate application that when executed assists a user, manager or leader of an existing social network application with managing a large number or a growing number of data followers, recipients, or subscribers (hereafter 'recipients'). The data recipients may be subscribed to one or more sources of information managed by the leader via the social networking application.

FIG. 1 illustrates an example network configuration used to provide the leader 101 with access to a social networking application and group of corresponding data recipients, according to example embodiments of the present invention. Referring to FIG. 1, the management application may be installed on the leader's user machine 102 which is connected to the Internet 100. The leader's machine 102 may connect to one or more known social networking websites and/or applications 120 (e.g., LinkedIn®, Twitter®, Hi5®, Facebook®, Bebo®, Orkut®, MySpace®, Friendster®, etc.). The social networking site may provide access to large numbers of users who may subscribe as data recipients 104 to the leader's special interest group, blog, topic, board, etc.

The management application may assist the leader 101 with managing or leading the data recipients 104 with items such as posting and delivering the data posts (e.g., text posts, video link posts, photograph posts, links, etc.). The posts initiated and created by the leader 101 may be delivered to a subset or portion of the data recipients 104. The subset of data recipients 104 may represent a portion of the total data recipients 104 who are interested in a current topic of interested that is being posted, which can include text, video, audio, multimedia, or any other form of data that is related to any particular topic (e.g., science, culture, politics, news, entertainment, etc.). Limiting the total number of data recipients to certain special interest groups may provide automated and targeted data post transmissions to certain end users based on the recipient's interests. Instead of sending each post generated by a leader to all of the subscribed data recipients, profiling the data recipients and organizing them by their known interests may yield optimal results. Instead of fearing that the number of data recipients 104 in a single account is growing too large, the leader 101 may be assured that the posts are sent to the data recipients that are most interested in what the user is posting at any given time.

Example embodiments of the present invention may provide determining when to split or limit the total number of data recipients into a smaller subset. The splitting may include taking at least one data recipient from the total number of data recipients and adding the removed data recipient to a new group of data recipients. The interaction(s) between the leader 101 and the data recipients 104 may be a factor used to determine when to place a data recipient in or out of a particular group. Other factors may include the data recipient's interaction with the data messages sent by the leader 101, including the subjective response content and frequency of responses.

At least one of the following examples is examined by the managing application when determining the threshold of when to split the data recipients. For instance, the number of responses or messages forwarded per leader post. The decrease in the number of responses or messages forwarded by the same individual per thread (which contain more than one post) indicating a drop in the level of interest of the follower. The number of characters per response per post. For example, a drop in the number of characters (over a certain period of time) indicates a drop in the level of interest of the follower/data recipient. The number of words capitalized, indicating a certain expression, for example, positive or negative. The number of responses for which the poster did not respond. The time elapsed between the message and the response. The key words used in the response, for example: "agree", "disagree", etc. Other criteria may be analyzed and used as a basis to include or exclude a particular data recipient from a particular data message posting or group of data recipients.

According to one example embodiment, the management application may be used to internally analyze the interactions between the user and the recipients. According to another example embodiment, the management application may be used to specifically configure a threshold to determine the proper time to split the data recipients into groups. These example embodiments and other example embodiments are described in detail below.

Example embodiments provide managing data recipients operating in messaging applications such as SMS, social networking and/or any wired or wireless based messaging application between two or more users, and more specifically related to the calculation of when to split data recipients or followers.

The example determinations described above may be used by the managing application for determining the level of interest that the data recipient has with respect to outgoing messages initiated by the leader. Those determinations are calculated by the application as the leader sends messages and analyzes the responses of the data recipients. Any of the configuration elements may be calculated and utilized alone, or two or more can be used to determine when to split the data recipients. The calculations for each of the various criteria are described in detail below.

For the splitting criteria based on a number of responses or message forwards per post, this determination examines the number of responses received by the data recipients 104 of outgoing posts as well as a number of message forwards that occur by the data recipients 104. The leader 101 may configure a threshold value reflecting an average number of responses or forwards per outgoing post so that when the number of responses and/or message forwards falls below the configured value, the data recipients 104 are divided into sub-groups. Each sub-group may reflect a portion of the total data recipients 104 currently subscribed to receive data from the leader 101. The example configuration criteria can be utilized in addition to other configurations elements to determine when to split the data recipients 104.

The number of responses and message forwards may be obtained by utilizing the APIs available to designers of popular messaging services. For example, in the Twitter® application, replies to tweets, or outgoing messages are known as 'mentions.' A developer is able to obtain the number of mentions in a tweet by using the statuses mentions. This operation returns the most recent mentions (i.e., a status containing @username where the username is the user of the application) for the authenticating user.

The operation utilizes the HTTP GET protocol and the following parameters are supported: since_id, optional, returns only statuses with an ID greater than (that is, more recent than) the specified ID, max_id, optional, returns only statuses with an ID less than (that is, older than) or equal to the specified ID, count, optional, specifies the number of statuses to retrieve, which may not be greater than 200, and page, optional, specifies the page or results to retrieve.

Using the status/mentions operation, the application obtains the number of mentions (statuses) in an outgoing post with the optional parameter count to specify how many mentions desired. The message forwards of posts are known as 'retweets' in the Twitter application. A developer is able to obtain the number of retweets by using the statuses retweets implementation. This operation returns the number of retweets of a given tweet, and utilizes the HTTP GET protocol and the following parameters are supported: id, required, the numerical ID of the tweet for which the retweets are desired, count, optional, specifies the number of retweets to retrieve, which may not be greater than 100. Using the status/retweets implementation, the application obtains the number of retweets in an outgoing post with the optional parameter count to specify the number of retweets that are desired.

For a number of responses or messages forwarded by the same individual per thread implementation, to determine the number of responses or message forwards by the same individual per post, or thread, the application utilizes the status/mentions and status/retweets implementations to obtain the number of message responses and/or message/retweets in a given post. Utilizing the returned data, the application obtains the id of a user that conducted the responses or retweets to determine the activity per follower.

For a number of characters per response per post implementation, this configuration element allows the leader to set a threshold value so that if the number of characters in the responses is reduced to or below a given threshold, the data recipients 104 or followers are split into sub-groups. To determine the number of characters per response per post, the application counts the number of characters in the responses. In the Twitter application, the application utilizes the status/mentions implementation to obtain the mentions (or message forwards) and then counts the number of characters and stores the value.

For a number of words capitalized implementation the number of words capitalized in a data recipient(s) 104 response can be interpreted as a relative level of interest that the data recipients 104 has for the message. Using the number of words that are capitalized by a follower in the algorithm, the managing application can determine the interest of the follower more precisely. The capitalized words can be used to express a positive or negative reaction by the data recipient 104. In either case, it will reflect a higher level of interest. This calculation added to the other calculations to determine the interest of the user will assist the managing application to correctly determine the data recipients' interests.

For a number of responses that the poster did not respond. This configuration allows a threshold to be set that examines the number of posts that did not get a response. To determine the number of responses that the poster did not respond to in the Twitter application, the application utilizes the status/mentions implementation to obtain the message responses in a given post. Utilizing the returned data, the application compares the data of the outgoing responses by the poster and compares the id of the recipient of the responses to the poster to determine those posts that the user did not respond to when a response was received.

For a time elapsed between the message received and the response sent implementation, a time elapsed between the time the follower received the message and sent the response is an additional factor used in determining the interest of the user. If the follower waited days before sending the response, it reflects a lower level of interest in the message than if the follower responded to the message immediately.

For a key words implementation, certain key words are coded into the managing application permitting the level of interest to be accurately determined. Key words such as "agree, disagree, interested, like, dislike" are stored in the application. The responses are examined and if the key words are included, the level of interest of the user is raised. Other key words can be added that if found in the follower's responses, raise the relative level of the follower's interest in the outgoing responses.

For storing the data internally, when the number of responses per post falls by a determined percentage, the user is able to choose to split the data recipients 104. The activity of the data recipients 104 is stored in an internal table entitled "followersActivityTable". This table is updated and records the data recipients 104 interaction with the leader's posts.

In another example embodiment, a table can be updated at various times. An internal follower activity table may be kept updated when responses and/or message forwards are obtained by the application. The managing application obtains the number of responses or message forwards per post and stores the value. Multiple responses and/or messages forwarded by the same data recipient are not written enabling the number to remain true with regard to all the data recipients 104 of the leader 101. The number of responses and forwards are obtained by the managing application and the value is written into the table automatically by the application.

In one example, the calculation of the value is performed upon initiation of the managing application. As part of the start-up sequence of the application, the number of responses and forwards of the user's posts are calculated per posting and that number value is recorded in the data recipients' 104 activity table. The calculation of the number value can be performed by a separate service running on the leader's computer 102 and can be programmed at a predetermined time each day to calculate the data recipients' 104 interests in the leader's posts. Other implementations of recording the data recipients 104 interests are also possible. For example, utilizing published APIs, it is possible for the service running on the user's computer to record in an internal table the number of responses or forwards of the leader's posts and record those values.

Figure 3A:
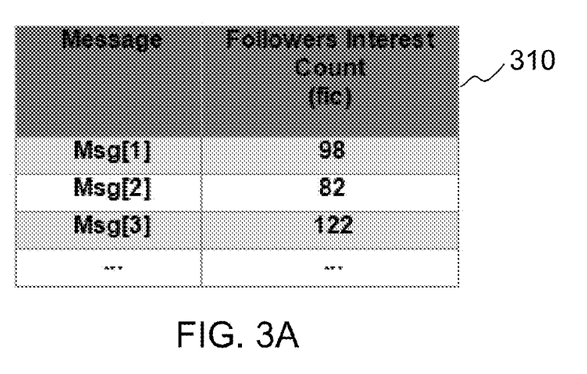
FIGS. 3A, 3B & 3C illustrate example tables of recipient data obtained from various functions used to measure recipient activity, according to an example embodiment of the present invention.
Figure 3B:
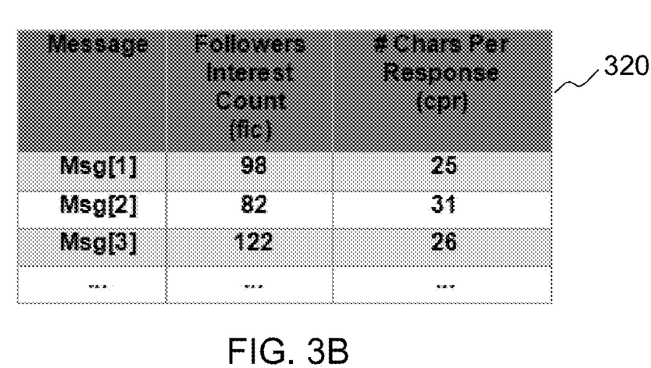
Figure 3C:
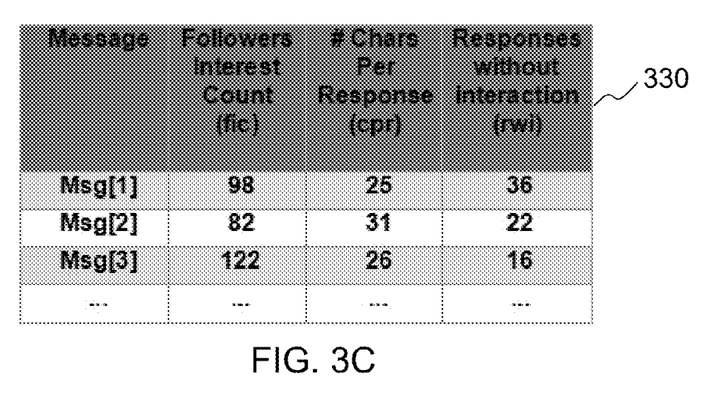

FIGS. 3A, 3B and 3C illustrate examples of data recipient/followers activity tables. Referring to FIG. 3A, table 310 illustrates individual messages [1], [2] and [3] having a corresponding followers interest count (fic) per message. The first message from the leader 101 is reflected as the first element in the message array, which has a follower's interest count of 98. This is interpreted as 98 followers of the leader have either responded to Msg[1] and/or have forwarded Msg[1] onward to other users. It is also possible to retain the message responses and the message forward counts separately if deemed necessary. A followers' interest count fic may be the number of total responses per message and/or the total number of responses from different followers per message.

Figure 4:
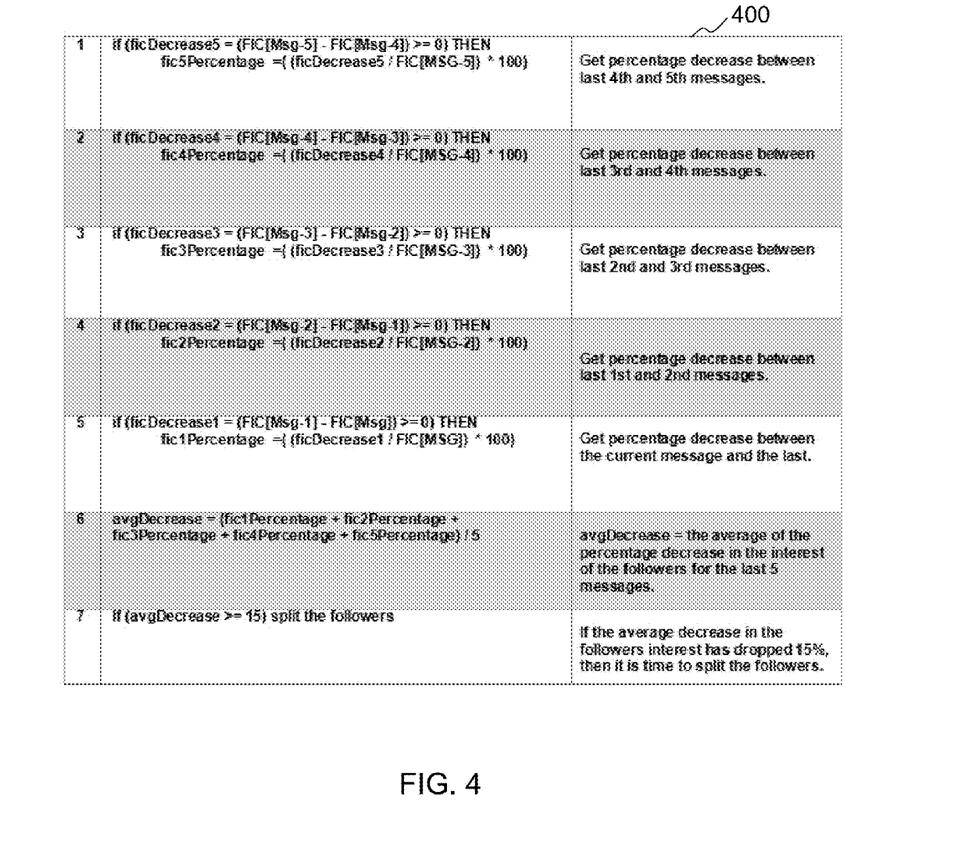

To determine an internal threshold, the interactions of the last five messages are calculated and the average of the percentage of decrease in interactions is determined. If that decrease is at or above a predetermine threshold amount, such as 15%, it is determined internally that a split among the data recipients 104 is necessary. FIG. 4 illustrates an example of an algorithm for calculating the percentage of decrease in follower interests for the last five messages posted. Referring to FIG. 4, the seven expressions in table 400 provide calculations for obtaining percentage decreases, average decreases and a threshold comparison.

In FIG. 4, operation one determines the percentage of difference of the number message replies and message forwards between the $5^{th}$ previous message and the $4^{th}$ previous message. If this difference is positive, it is stored, otherwise the negative number means that the percentage actually increased. This calculation is repeated for each of the previous outgoing messages posted by the leader 101 in steps 2-5. In step 6, the average of all of the differences between interactions of the outgoing messages is calculated and written into a value 'avgDecrease.' If the avgDecrease is above a certain threshold (for example 15%), this would reflect that the threshold has been obtained and the followers are split in operation 7. The threshold of 15% is for example purposes only and may vary. One skilled in the art in the aspect of algorithm design may determine a more advisable number.

Referring to FIG. 3B, table 320 illustrates a number of characters per response per post, which reflects a level of interest in the followers by keeping track of the number of characters the followers send in their response to the leader's message posts. The number of character value provides that if the number of characters in the response post is decreasing, then it may reflect that the level of interest in the user's posts is also decreasing. The number of characters per response (cpr) alone does not signify the level of interest in the leader's posts, however the cpr along with other calculations may indicate a trend in the interests of the data recipients 104.

To determine a corresponding internal threshold, the interaction of the characters per response of the last five messages is calculated and the average of the decreased percentage is determined. If the decrease is at or above 15%, it is determined internally that it is time to split the data recipients 104. FIG. 5 illustrates an example of an algorithm used for calculating the percentage of decrease in the number of characters per response for the last five messages.

Referring to FIG. 5, table 500 illustrates internal calculation of characters per response. Operation 1 determines the percentage of difference of the number of characters in responses between the 5th previous message and the 4th previous message. If this difference is positive, it is stored, otherwise the negative number indicates that the percentage actually increased. The calculation is repeated for each of the previous outgoing messages by the leader in operations 2-5. In operation 6, the average of all of the differences between the amount of characters in responses is calculated and written into a value 'avgDecrease.' If the avgDecrease is above a certain threshold (for example 15%), this would reflect that the threshold has been met, and the followers are split, at operation 7.

The last metric calculated is the number of responses for which the leader did not respond, responses without interaction (rwi). This metric rwi is useful to determine the communication between the data recipients and the leader. If this communication decreases, it may indicate that the size of the data recipients has grown to a size where the leader is no longer comfortable to submit posts without concentrating instead on the data recipients interests.

FIG. 3C illustrates this additional metric rwi in addition to the first metrics fic and cpr in the table 300. It may be noted in FIG. 3C that the number of responses that are not interacted with by the leader is increasing each time the leader posts an outgoing message. This may indicate that the leader interaction between the leader and data recipients 104 is declining. This metric is weighed against the other metrics to determine if the interaction between the leader and the data recipients has approached a threshold and the data recipients should be split into groups.

To determine the internal threshold, the number of responses without interaction for a last number of messages, for example, five, is calculated and the average of the percentage of increase is determined. If that value of increase is at or above 15%, it is determined internally that it is time to split the data recipients 104. FIG. 6 illustrates an example of the algorithm for calculating the percentage of increase in the number of responses without interaction with the last five messages.

Referring to FIG. 6, table 600 illustrates operation 1 which determines the percentage of difference of the number responses without leader interaction between the $5^{th}$ previous message and the $4^{th}$ previous message. If this difference is positive, it is stored, otherwise the negative number indicates that the percentage actually increased. This calculation is repeated for each of the previous outgoing messages by the user, at operations 2-5. In operation 6, the average of all of the differences between the number of responses without user interactions is calculated and written into a value 'avgDecrease.' If the avgDecrease is above a certain threshold (for example 15%), this would reflect that the threshold has been met, and the followers are split, at operation 7.

In another example embodiment, the algorithms mentioned above can be combined and weighed to arrive at a more concrete algorithm of when to split the data recipients utilizing all of the criteria. When splitting the data recipients or followers, the leader can either let the managing application determine when the threshold has been approached, or the leader can configure the thresholds that will cause the managing application to notify the leader. In the configuration of the managing application, a graphical user interface (GUI) allows the leader to select how to determine the thresholds of when to split the data recipients.

Figure 7A:
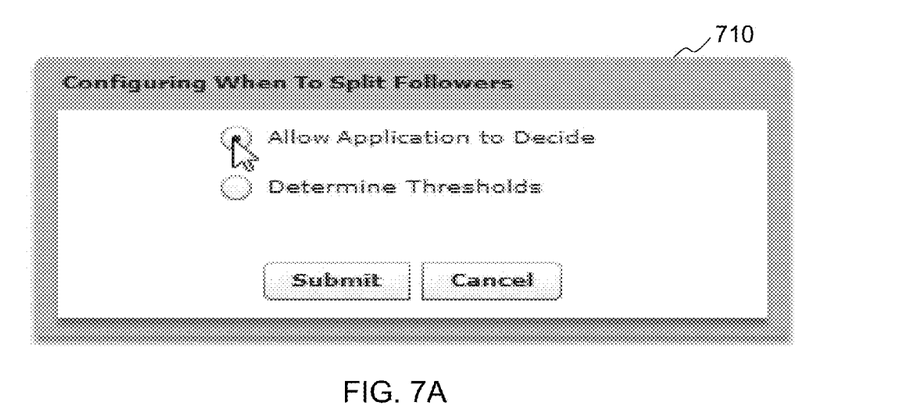
FIGS. 7A and 7B illustrate example graphical user interfaces (GUIs) used to manage recipient data, according to an example embodiment of the present invention.
Figure 7B:
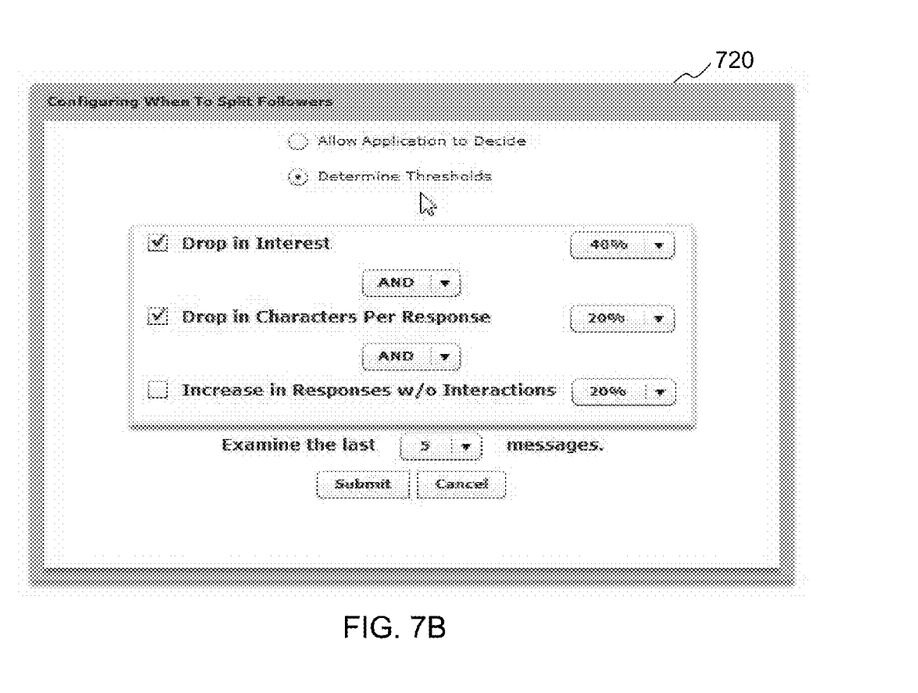

FIG. 7A illustrates a GUI 710 that provides the leader with an option to allow the application to determine when the data recipients should be split into groups based on one or more calculations described in detail above. The leader may instead select to determine the thresholds manually. FIG. 7B illustrates another GUI 720 used to determine thresholds corresponding the to fic, cpr and rwi values tabulated in FIGS. 3A, 3B and 3C.

The configuration window of GUI 710 provides the user with options to determine if the application will determine the threshold of when to split the data recipients, or if more control is desired as to calculating the threshold of when to split the data recipients. The leader has the option to select the first button, so the application will decide when to split the followers. This calculation is based on algorithms depicted in the figures above. If the leader selects the second button, the GUI window expands, and the content of FIG. 7B is presented. In GUI 720, the leader has selected to calculate the thresholds manually. There are three checkboxes available for the user to determine how the threshold is determined. The user is able to check one or more of the checkboxes. Between each of the checkbox components is a drop-down component containing a list with the following elements: "AND"—the component below will be "AND'ed" with the component above, "OR"—the component below will be "OR'ed" with the component below, and XOR"—the component below will be "XOR'ed" with the component below. Each of the checkbox components includes a drop-down component that includes the percentages: 20%, 40% and 60%. These percentage values are for example purposes, and other values may be provided allowing different thresholds to be selected by the leader.

Below the checkbox component, an additional component exists to configure the number of messages, or outgoing posts, to examine in the analysis. The drop-down component contains values 1 through 10, assuming that there are at least 10 outgoing messages to be examined.

In FIG. 7B, the leader has selected to examine 5 messages. So the last 5 messages will be examined, and the interactions between each of the 5 messages will be analyzed. The more messages that the user selects to analyze, the higher the accuracy of the calculations. In the first checkbox component, the leader indicated the percentage decrease in the followers' interest. The interest is calculated as the number of message forwards per post, and the number of message replies per post. In FIG. 7B, the leader has checked the first checkbox and selected the percentage to be 40%. This is interpreted as the threshold that will be met for this component if the average interest of the data recipients falls 40 percent over the last 5 outgoing messages.

The second checkbox indicates the percentage decrease in the number of characters per response from the data recipients. The leader has also selected 20% in the dropdown component. This is interpreted as the threshold being met if the average number of characters in the response of the data recipients has decreased over the last five outgoing messages. The user has also selected the "AND" selection in the drop-down component between the first and second check boxes. This indicates that both of the first two components have to be true before the threshold is met. If the user had chosen "OR" in the component, then either one of the two check boxes could have met the threshold. The last checkbox indicates the percentage increase in the number of responses without interactions from the user. The larger the value of this component indicates a lack of direct involvement such that splitting the data recipients may be inevitable for future postings.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 2:
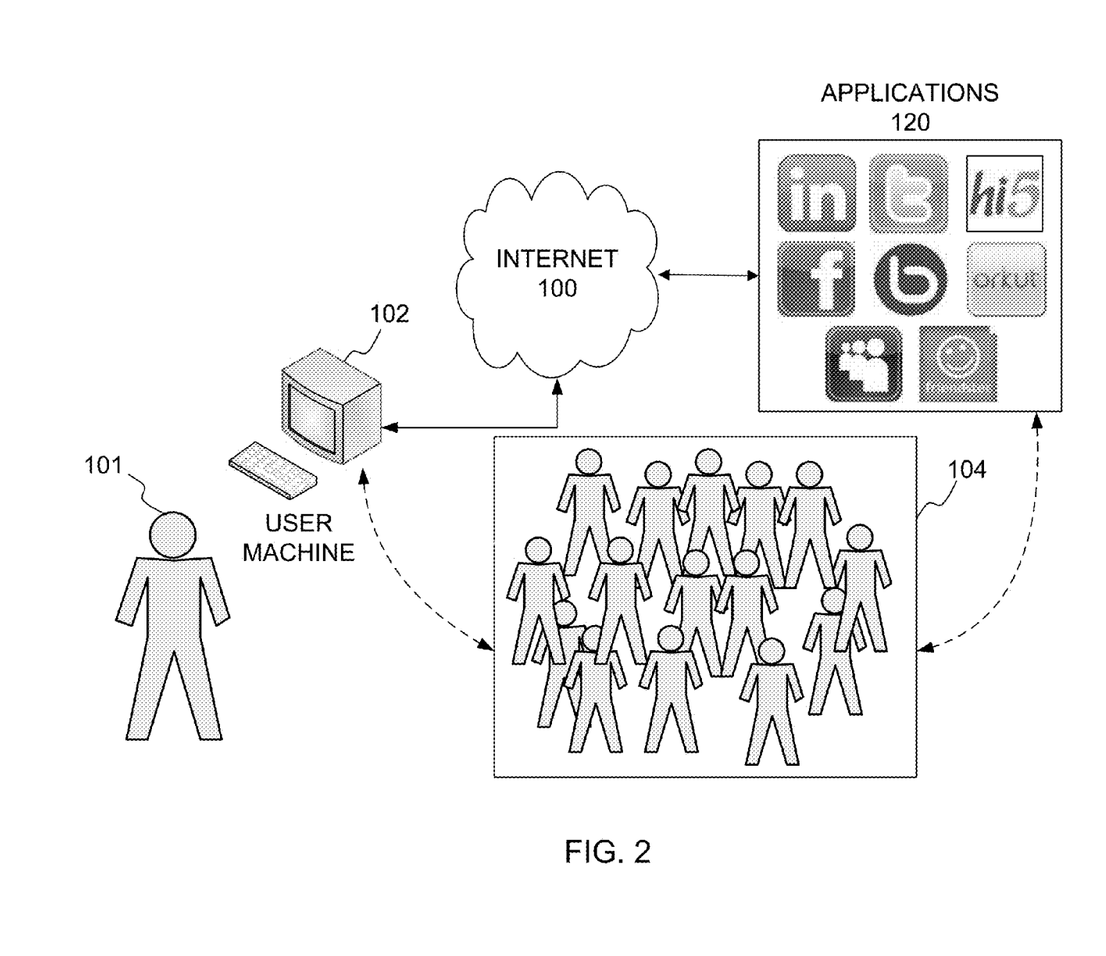
FIG. 2 illustrates an example data network used for social networking applications, according to example embodiments of the present invention.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of FIG. 2.

Figure 8:
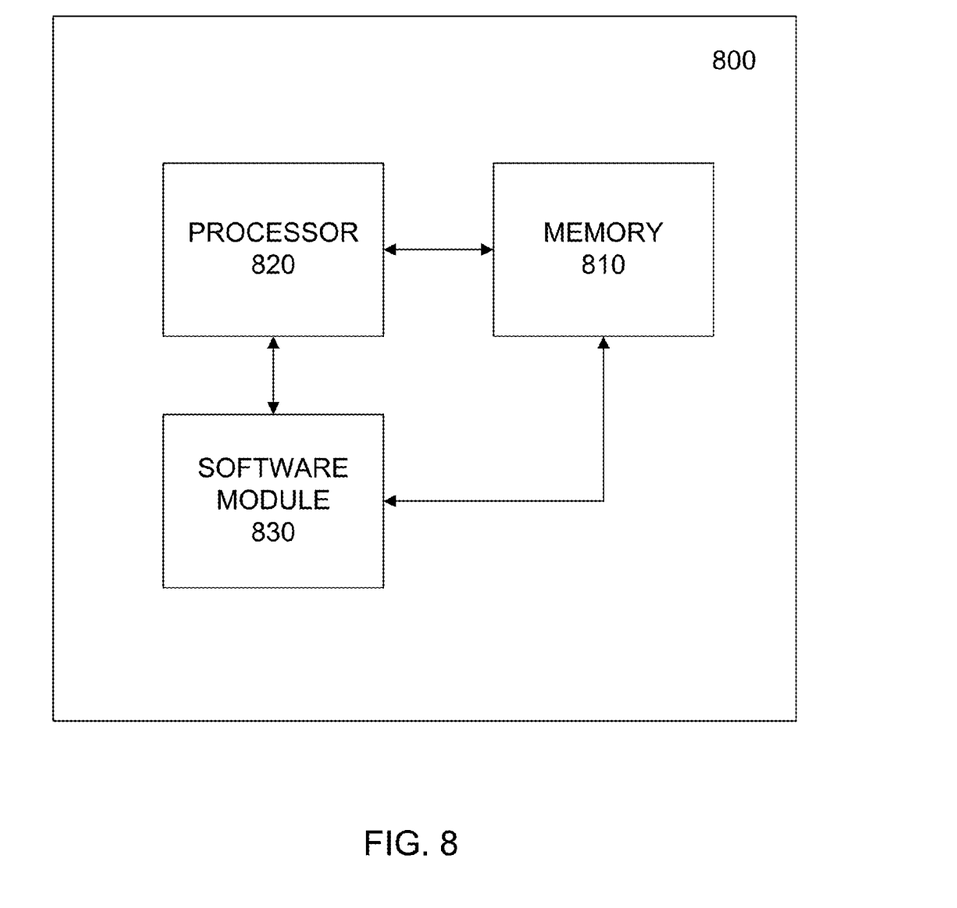
FIG. 8 illustrates an example network entity device configured to store instructions, software, and including corresponding hardware for performing various operations, according to example embodiments of the present invention.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Figure 9:
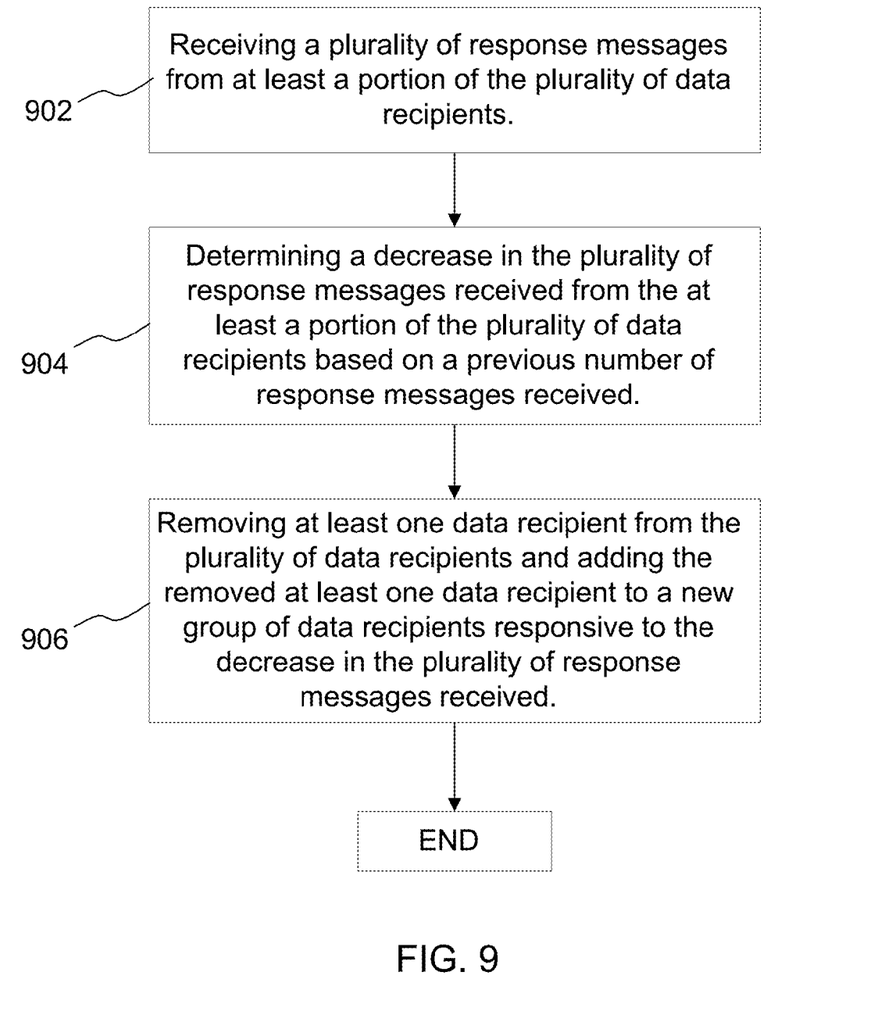
FIG. 9 illustrates a flow diagram of an example method of operation, according to example embodiments of the present invention

One example method of operation may include a method of organizing a plurality of data recipients subscribed to receive information from a leader. The method may include receiving a plurality of response messages from at least a portion of the plurality of data recipients, at operation 902, and determining a decrease in the plurality of response messages received from the at least a portion of the plurality of data recipients based on a previous number of response messages received, at operation 904. The method may also include removing at least one data recipient from the plurality of data recipients and adding the removed at least one data recipient to a new group of data recipients responsive to the decrease in the plurality of response messages received, at operation 906.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    subscribing a plurality of data recipients to receive posted information from a leader;
    receiving a plurality of response messages from at least a portion of the plurality of data recipients;
    determining a decrease in the plurality of response messages received from the at least said portion of the plurality of data recipients based on a previous number of response messages received;
    determining a number of characters per response of the plurality of response messages;
    when the number of characters per response message is lesser related to a more recent response message than related to a less recent response message then removing at least one data recipient from the plurality of data recipients and adding the removed at least one data recipient to said new group of data recipients; and
    determining a number of response messages without interaction from the leader for the plurality of response messages; and
    when the number of response messages without interaction is lesser related to a more recent response message than related to a less recent response message then removing the at least one data recipient from the plurality of data recipients and adding the removed at least one data recipient to said new group of data recipients.

2. The method of claim 1, wherein determining a decrease in the plurality of response messages received from the at least said portion of the plurality of data recipients further comprises:
    comparing a total number of response messages received related to a first transmitted message to a total number of response messages received related to a second transmitted message; and
    determining a percentage decrease in response messages received based on a difference between the total number of response messages received related to the first transmitted message and the total number of response messages received related to the second transmitted message.

3. The method of claim 2, further comprising:
    repeating the comparing and determining operations to determine a second percentage decrease in response messages received between the second transmitted message and a third transmitted message, a third percentage decrease in response messages received between the third transmitted message and a fourth transmitted message, and a fourth percentage decrease in response messages received between the fourth transmitted message and a fifth transmitted message; and
    determining an average percentage decrease based on the first, second, third and fourth percentage decrease values.

4. The method of claim 3, further comprising:
    comparing the average percentage decrease value to a predetermined threshold value and when the average percentage decrease value is less than the predetermined threshold value then removing at least one data recipient from the plurality of data recipients and adding the removed at least one data recipient to said new group of data recipients.

5. The method of claim 1, further comprising:
    automatically determining that the at least one data recipient to be removed from the plurality of data recipients based on at least one of a decrease in interest among the plurality of data recipients, a decrease in characters per response messages received, and a decrease in interactions with the leader.

6. An apparatus, comprising:
    a memory; and
    a processor to:
    subscribe a plurality of data recipients to receive posted information from a leader;
    receive a plurality of response messages from at least a portion of the plurality of data recipients;
    determine a decrease in the plurality of response messages received from the at least said portion of the plurality of data recipients based on a previous number of response messages received;

determine a number of characters per response related to the plurality of response messages, and when the number of characters per response message is lesser related to a more recent response message than related to a less recent response message then remove at least one data recipient from the plurality of data recipients and add the removed at least one data recipient to said new group of data recipients; and determine a number of response messages without interaction from the leader related to the plurality of response messages, and when the number of response messages without interaction is lesser related to a more recent response message than related to a less recent response message then remove at least one data recipient from the plurality of data recipients and add the removed at least one data recipient to said new group of data recipients.

7. The apparatus of claim 6, wherein to determine a decrease in the plurality of response messages received from the at least said portion of the plurality of data recipients further comprises to:

compare a total number of response messages received related to a first transmitted message to a total number of response messages received related to a second transmitted message, and determine a percentage decrease in response messages received based on a difference between the total number of response messages received related to the first transmitted message and the total number of response messages received related to the second transmitted message.

8. The apparatus of claim 7, wherein the processor repeats the compare and determine operations to determine a second percentage decrease in response messages received between the second transmitted message and a third transmitted message, a third percentage decrease in response messages received between the third transmitted message and a fourth transmitted message, and a fourth percentage decrease in response messages received between the fourth transmitted message and a fifth transmitted message, and to determine an average percentage decrease based on the first, second, third and fourth percentage decrease values.

9. The apparatus of claim 8, wherein the processor further compares the average percentage decrease value to a predetermined threshold value and when the average percentage decrease value is less than the predetermined threshold value then remove at least one data recipient from the plurality of data recipients and add the removed at least one data recipient to said new group of data recipients.

10. The apparatus of claim 6, wherein the processor automatically determine that the at least one data recipient to be removed from the plurality of data recipients based on at least one of a decrease in interest among the plurality of data recipients, a decrease in characters per response messages received, and a decrease in interactions with the leader.

11. A non-transitory computer readable storage medium configured to store instructions that when executed cause a processor to perform:

subscribing a plurality of data recipients to receive posted information from a leader;

receiving a plurality of response messages from at least a portion of the plurality of data recipients;

determining a decrease in the plurality of response messages received from the at least said portion of the plurality of data recipients based on a previous number of response messages received;

determining a number of characters per response related to the plurality of response messages; and when the number of characters per response message is lesser related to a more recent response message than related to a less recent response message then removing at least one data recipient from the plurality of data recipients and adding the removed at least one data recipient to said new group of data recipients; and determining a number of response messages without interaction from the leader related to the plurality of response messages; and when the number of response messages without interaction is lesser related to a more recent response message than related to a less recent response message then removing at least one data recipient from the plurality of data recipients and adding the removed at least one data recipient to said new group of data recipients.

12. The non-transitory computer readable storage medium of claim 11, wherein determining a decrease in the plurality of response messages received from the at least said portion of the plurality of data recipients further comprises:

comparing a total number of response messages received related to a first transmitted message to a total number of response messages received related to a second transmitted message; and determining a percentage decrease in response messages received based on a difference between the total number of response messages received related to the first transmitted message and the total number of response messages received related to the second transmitted message.

13. The non-transitory computer readable storage medium of claim 12, wherein the processor is further performs:

repeating the comparing and determining operations to determine a second percentage decrease in response messages received between the second transmitted message and a third transmitted message, a third percentage decrease in response messages received between the third transmitted message and a fourth transmitted message, and a fourth percentage decrease in response messages received between the fourth transmitted message and a fifth transmitted message; and determining an average percentage decrease based on the first, second, third and fourth percentage decrease values.

14. The non-transitory computer readable storage medium of claim 13, wherein the processor further performs:

comparing the average percentage decrease value to a predetermined threshold value and when the average percentage decrease value is less than the predetermined threshold value then removing at least one data recipient from the plurality of data recipients and adding the removed at least one data recipient to said new group of data recipients.

* * * * *